(12) United States Patent
Doglioni Majer et al.

(10) Patent No.: US 9,877,608 B2
(45) Date of Patent: Jan. 30, 2018

(54) DEVICE AND PROCESS FOR A CONTROLLED BEVERAGE DISPENSING

(71) Applicant: CARIMALI S.p.A., Chignolo d'Isola (BG) (IT)

(72) Inventors: Andrea Doglioni Majer, Chignolo d'Isola (IT); Maurizio Boffelli, Chignolo d'Isola (IT); Marco Liberali, Chignolo d'Isola (IT)

(73) Assignee: CARIMALI S.P.A., Chignolo d'Isola (BG) (IT)

( * ) Notice: Subject to any disclaimer, the term of this patent is extended or adjusted under 35 U.S.C. 154(b) by 0 days.

(21) Appl. No.: 15/028,586

(22) PCT Filed: Oct. 17, 2014

(86) PCT No.: PCT/IB2014/065425
§ 371 (c)(1),
(2) Date: Apr. 11, 2016

(87) PCT Pub. No.: WO2015/056241
PCT Pub. Date: Apr. 23, 2015

(65) Prior Publication Data
US 2016/0296065 A1 Oct. 13, 2016

(30) Foreign Application Priority Data
Oct. 18, 2013 (EP) .................................... 13189436

(51) Int. Cl.
*A47J 31/56* (2006.01)
*A47J 31/46* (2006.01)
(Continued)

(52) U.S. Cl.
CPC ............... *A47J 31/56* (2013.01); *A23F 5/262* (2013.01); *A47J 31/36* (2013.01); *A47J 31/46* (2013.01)

(58) Field of Classification Search
CPC .. A23F 5/262; A47J 31/36; A47J 31/46; A47J 31/56
See application file for complete search history.

(56) References Cited

U.S. PATENT DOCUMENTS 3,795,788 A * 3/1974 Perucca ................. A47J 31/545
392/396
5,613,422 A * 3/1997 Giuliano ................ A47J 31/36
99/281
(Continued)

FOREIGN PATENT DOCUMENTS

CN 201230839 Y 5/2009
EP 0540440 A1 5/1993
(Continued)

OTHER PUBLICATIONS

English Translation for FR2683135 published May 1993.*
(Continued)

*Primary Examiner* — Anthony Weier
(74) *Attorney, Agent, or Firm* — Lucas & Mercanti, LLP

(57) ABSTRACT

A device for dispensing beverages having a brewing group, a boiler, a duct connecting the latter to the brewing chamber and means for supplying cold water to the duct of hot water, a proportional electrovalve arranged to control the supply of cold water, and at least one temperature sensor downstream the supply point of cold water, with respect to the water flow, in order to detect the temperature of the brewing water supplied to the brewing chamber.

20 Claims, 1 Drawing Sheet

(51) Int. Cl.
 *A47J 31/36* (2006.01)
 *A23F 5/26* (2006.01)

(56) References Cited

U.S. PATENT DOCUMENTS

| | | | | |
|---|---|---|---|---|
| 8,607,690 B1* | 12/2013 | Bresciani | ............... | A47J 31/542 |
| | | | | 99/279 |
| 2006/0005712 A1* | 1/2006 | Greenwald | ............ | A47J 31/56 |
| | | | | 99/275 |
| 2006/0042470 A1 | 3/2006 | Anson | | |
| 2008/0017041 A1* | 1/2008 | Beretta | ................... | A47J 31/46 |
| | | | | 99/279 |
| 2010/0018404 A1* | 1/2010 | Villa | ....................... | A47J 31/56 |
| | | | | 99/288 |
| 2011/0097454 A1* | 4/2011 | Coccia | ................... | A47J 31/36 |
| | | | | 426/231 |
| 2011/0113970 A1* | 5/2011 | Liu | ...................... | A47J 31/465 |
| | | | | 99/300 |
| 2012/0219686 A1* | 8/2012 | Bombeck | ............... | A47J 31/043 |
| | | | | 426/431 |
| 2013/0108755 A1* | 5/2013 | Carbonini | ............... | A47J 31/46 |
| | | | | 426/433 |
| 2015/0216355 A1* | 8/2015 | Duvall | .................... | A47J 31/56 |
| | | | | 99/282 |

FOREIGN PATENT DOCUMENTS

| | | |
|---|---|---|
| FR | 2683135 A1 | 5/1993 |
| WO | 0176429 A1 | 10/2001 |

OTHER PUBLICATIONS

Merrian Webster. 2016. http://www.merriam-webster.com/dictionary/boiler.*
International Search Report and Written Opinion for International Application No. PCT/IB2014/065425 (dated Jan. 21, 2015) ( 11 pages).

* cited by examiner

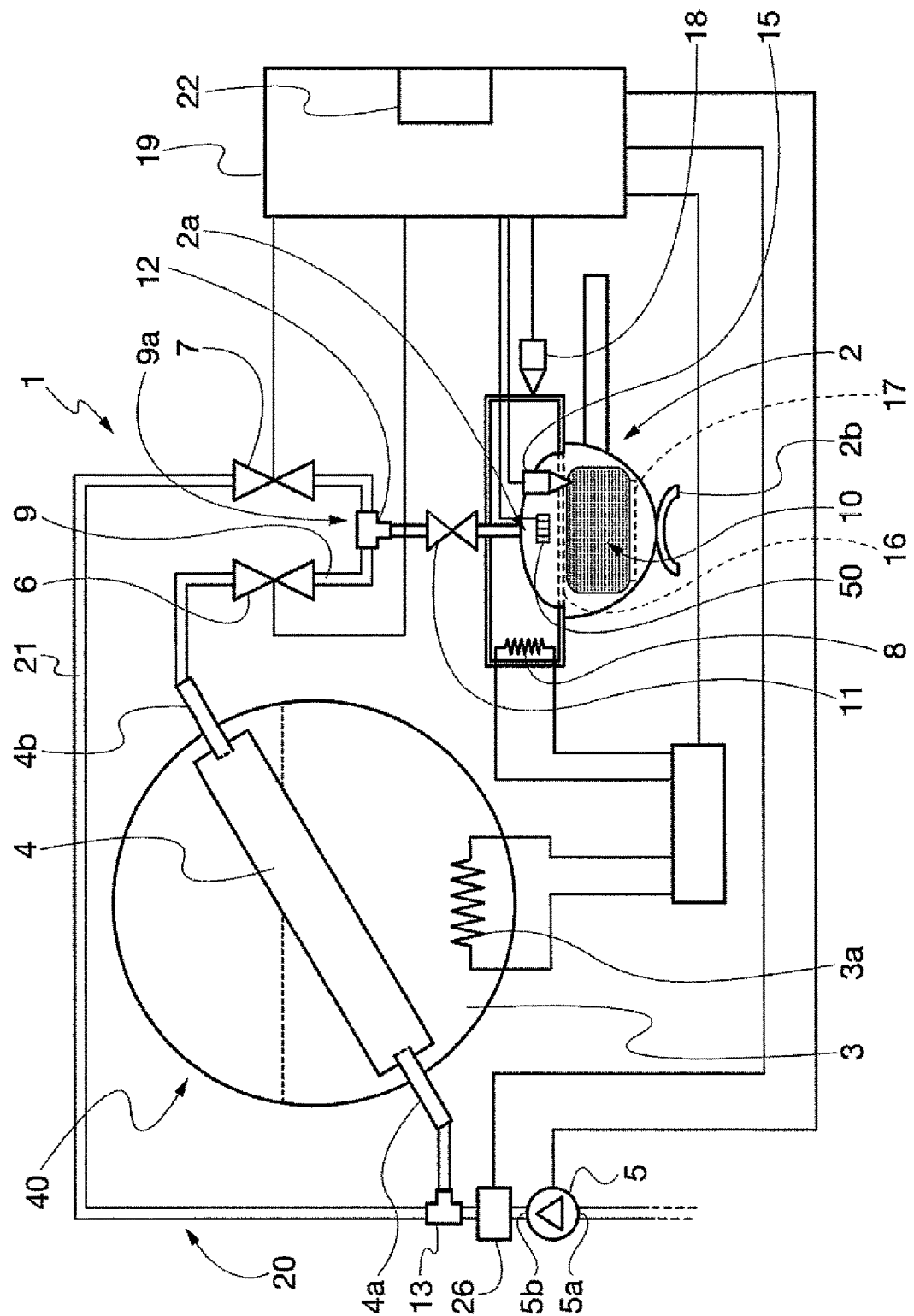

DEVICE AND PROCESS FOR A CONTROLLED BEVERAGE DISPENSING

CROSS-REFERENCE TO RELATED APPLICATIONS

This application is a 371 of PCT/IB2014/065425, filed Oct. 17, 2014, which claims the benefit of European Patent Application No. 13189436.2 filed Oct. 18, 2013.

FIELD OF THE INVENTION

The present invention concerns a device and a process for preparing and dispensing beverages, such as for example coffee, tea, chocolate, in manual and automatic machines. More particularly, the invention refers to a device, i.e. a machine, and a process for preparing coffees; to such a beverage is hereinafter and in the claims referred without for this reason limiting the invention only to the preparation of coffee.

PRIOR ART

It's known art devices, i.e. machines, for the preparation of hot beverages in which a boiler is present, by which the water fed to a brewing group is heated, in the latter being a chamber for the brewing of the required beverage, for example from powder of ground coffee. Further, the boiler is for producing vapor and/or hot water for other uses, such as milk frothing, tea and the like.

In coffee machines the water at room temperature, i.e. "cold" water coming from the mains connection or an independent tank, is usually heated to a temperature of about 120° C. by means of a heating element submerged in the water inside the boiler. Then, inside the boiler, there is water both in the liquid state and in the vapor state. The water in the liquid state is usually used for preparing tea or brewing beverage whereas the vapor, stored up in the upper part of the boiler, is used for heating and/or frothing the milk for the preparation of beverages such as chocolate, cappuccino and similar.

The water contained in the boiler is too hot to be used for preparing coffees. In fact, to assure the best organoleptic features of a coffee obtained by a determined blend of ground coffee, the water has to be infused according to three specific parameters: temperature, pressure and duration. For example, the Italian espresso (50 ml volume), prepared according to the known art, provides for a brewing temperature of about 92° C., a water pressure of about 10 bar and a brewing duration of about 20 seconds. For the so-called American coffee, of over 200 ml volume, the flow rate and pressure have to be modified (and sometimes the temperature too) from what is provided for an espresso, with the consequent modification problems of the brewing conditions.

Machines for preparing coffee are known, which are provided with a heat exchanger placed inside a boiler; the heat exchanger has the inlet and outlet outside of the boiler; water at room temperature is flowed between the inlet and the outlet of the heat exchanger for heating the water through the heat that the hot water contained inside the boiler gives to the heat exchanger. The heat exchanger is designed with a particular geometrical shape and a particular shape and/or position of nozzles inside thereof in order to increase the temperature of the water fed into its inlet of a determined amount; then, by feeding water at room temperature and having a determined flow rate at the inlet of the heat exchanger, water at the desired temperature is obtained at the outlet, being adapted for a determined coffee type.

Machines provided with several brewing groups are further known, in which every group is associated with a heat exchanger having particular shape and particular nozzles so that to obtain a temperature of brewing water for each group. This type of solution is used, for example, in a mono-boiler system, in which a single boiler with great capacity is provided with a determined number of heat exchangers and every heat exchanger is associated with a specific brewing group. In addition, the hot water contained in the boiler is also used for maintaining the metallic mass of every brewing group at an appropriate temperature for a proper brewing, thanks to the termosiphon-like circuit that provides the water use for heating the metallic mass of the brewing group.

Systems are further known in which the hot water for the coffee brewing is not heated by means of heat exchangers, but rather it is drawn directly from the boiler and mixed with a determined water volume at room temperature added at the inlet of every brewing group. The adjustment of brewing temperature is carried out mechanically by the user by screwing or unscrewing a screw that adjusts the flow of water at room temperature fed in every brewing group.

Other solutions have been proposed, which have a multi-boiler system in which the use of at least one boiler for every brewing group is provided. Such a system can comprise a first boiler for pre-heating the water entering in each boiler of the brewing groups and an additional boiler for the generation of vapor and hot water for preparing tea or infused beverages. Then, in every group a specific boiler is provided in which the user can set up the brewing temperature by adjusting the temperature of water contained in each boiler.

The heretofore described solutions do not allow an adjustment of the brewing temperature in real time and force the user to predetermine the working temperatures in each brewing group. In other words, the temperature adjustment of each group is not a simple and quick operation, then, in case the user has set up different temperatures, for example in a machine with two groups, the preparation of a specified coffee type will be necessarily obtained in the group intended therefor and can not be carried out in parallel on the other group, thereby limiting the capacity of dispensing of the machine considerably. For dispensing in parallel the same coffee type from the two groups, the temperature of a group has to be again adjusted, which is usually feasible not speedily and usually only when the machine is open and/or in the factory.

A solution implemented by the Applicant uses a system in which the brewing temperature is adjusted by mixing cold water, at the inlet of every brewing group, with the water coming from the respective heat exchanger. The control of the water flow at room temperature is carried out by switching the opening and closing of an electrovalve with a particular duty cycle. A determined volume of water at room temperature is mixed with the hot water coming from the heat exchanger at regular intervals during brewing. The temperature of brewing water is adjusted at a determined value by changing the duty cycle of electrovalve switching.

Another problem common in all known machines is that the dispensing conditions change in a not-programmed way, for example because of a different dimension of particles of ground coffee or change of temperature or atmospheric pressure, or else because of specific dispensing sequences.

An example of modifications of dispensing conditions are the pressure modifications occurring when the resistance of the coffee cake changes while the hot water is passing through it during the brewing cycle. In fact, as the coffee cake is wet by hot water, inside the cake preferred paths are formed in which the water runs into less resistance and this creates an initial fall in the pressure of hot water that flows inside the heat exchanger; as time goes by, in the cake a built-up of finer coffee particles is formed on the filter, causing a pressure increase at the brewing end.

Pressure variations can occur, for example, also changing the coffee grain size. In fact, for preparing an espresso, various elements have to be considered among which the humidity, which causes a variation of the cake resistance. Further, as known, a different grain size of coffee powder offers a different resistance to the water passage through the coffee cake and, consequently, a different pressure of hot water fed into the brewing group.

In order to solve this problem, i.e. to be able to compensate undesirable variations of beverage brewing conditions, the control of the water flow rate fed to the brewing chamber, i.e. the brewing group, has been proposed, so that to be able to operate with a substantially constant flow rate during the brewing and dispensing steps.

In addition, it has been proposed to control the water pressure entering into the brewing group, both to ameliorate the extraction conditions, and to compensate the undesired variations of extraction conditions.

However the proposed solutions can be adopted only in specific types of coffee machines and anyway they are not so effective and do not solve the problem satisfactorily.

The present invention comes also from the fact that the Applicant verified that pressure variations occur because of variation of the resistance against the water passage through the coffee cake, this affecting the heat exchanger present in the boiler, in which water expansions can be produced that cause variations of pressure of hot water exiting from the heat exchanger. Then, by changing for example the grain size of powdered coffee or anyway, in general, when the resistance to the passage of hot water through the coffee cake changes, pressure and temperature variations can occur that the above described known systems can not compensate.

Variations of temperature of hot water exiting from the heat exchanger can also occur in function of the frequency with which the machine dispenses a determined beverage amount. For example, if different beverages are dispensed one after another with no pauses, the temperature of water coming out from the heat exchanger at the last dispensing will be lower than the starting temperature.

In the same way, the variations of pressure carried out when the dispensing is controlled by a pressure control, will lead to temperature variations of water coming into the brewing group. The same problem can occur when the brewing step is controlled by controlling the water flow rate. Such variations can compromise the quality of dispensed beverage.

SUMMARY OF THE INVENTION

Object of the present invention is to overcome the afore described problems of the known previous art, and to provide a device and a process allowing the compensation of variations of brewing and dispensing conditions, so that to assure a better quality of the dispensed beverage and a reliability higher than the devices and/or methods of the known previous art.

Another object is to provide a device that can be also used both on conventional machines (with hand-loaded coffee per each brewing, with a filter-holder) and on automatic machines.

This and other objects are reached by the present invention by a device for a controlled beverage dispensing according to claim 1; preferred embodiments are reported in the dependent claims.

In particular, according to the present invention, the device for a controlled beverage dispensing comprises at least one brewing group provided with at least one inlet for hot water, at least one boiler provided with at least one heat exchanger and at least one pump for feeding water at the inlet of the heat exchanger of the boiler. A duct feeds the water from the boiler to the brewing group, which comprises a brewing chamber.

The device further comprises a first electrovalve that is positioned on means for supplying cold water to the water supply duct towards the brewing group; preferably, there is also a second electrovalve connecting hydraulically the outlet of the heat exchanger with at least one inlet of the brewing group. The supply point of cold water on the first duct is preferably downstream the second valve, with respect to the water flow (from the valve to the brewing group). In an embodiment, the supply point of cold water is inside the brewing group, but outside the brewing chamber.

For the purposes of the present invention, with the term "hot water" is intended the water exiting from the heating means; the term "cold water" is intended to define the not-heated water, at room temperature and coming from a storage tank or the mains connection. Preferably, the cold water is not chilled. "Brewing water" means the water coming from the mixing of hot and cold water and supplied to the brewing chamber.

In a preferred embodiment, the first electrovalve connects hydraulically the pump outlet with at least one inlet of the brewing group. The device is further characterized by comprising at least one temperature sensor placed downstream the two electrovalves, with respect to the water flow.

During a beverage preparation, the hot water exiting from the heat exchanger is mixed with water at room temperature so that to obtain a desired brewing temperature as a function of the volume of brewing water fed into the brewing chamber. Such a profile of brewing temperature is specific for a dispensing coffee type and allows compensating the pressure and temperature variations that could affect a proper beverage dispensing.

The cold water is fed by an electrovalve of proportional (proportioning) type for the flow rate control, so that the cold water to be mixed with hot water coming from the heat exchanger could have a flow rate proportional to the difference between the brewing temperature inside the group and a determined instantaneous temperature of a temperature profile associated with a specific coffee type.

In this way, it is possible to compensate the temperature variations of hot water exiting from the heat exchanger, if present, and to obtain a controlled beverage dispensing with a proper brewing and, if desired, with a particular temperature profile function of the volume of brewing water fed to the brewing group.

According to a further preferred embodiment, a proportional electrovalve is arranged also on the duct exiting from the heating means, i.e. on the hot water circuit, upstream the mixing of hot water with cold water.

In other words, the hot water and cold water circuits are each provided with a proportional electrovalve, and the two electrovalves are independent from each other. Thanks to this solution the flow rate of hot water and the flow rate of cold water can be adjusted independently from one another.

As previously mentioned, the subsequent mixing of hot water with cold water forms the brewing water. Therefore, in this embodiment, the temperature of the brewing water can be changed without changing its flow rate entering into the brewing chamber and, vice versa, the flow rate can be changed without changing the temperature. Thanks to this, for example, if the temperature of brewing water has to be increased, the flow rate of hot water can be increased while simultaneously decreasing the flow rate of cold water. In this way, while the flow rate of the brewing water remains unchanged, the temperature changes. Similarly, for example, both the flow rate of hot water and the flow rate of cold water can be simultaneously increased. In this way, the flow rate of the brewing water can be changed without changing its temperature.

Further, as previously mentioned, the grain size of the ingredient for preparing the beverage, such as powdered coffee, can affect the beverage dispensing operations. In particular, a particularly fine ingredient may provide a greater resistance to the passage of water, resulting in a prolonged dispensing time of the beverage.

This causes the decreasing of the water flow rate towards the brewing chamber and, consequently, the increasing of the time for the hot water to pass through the inside of the heat exchanger. This causes the hot water to be overheated with respect to the desired values. Such an overheating causes the water to slightly expand, thereby causing the water pressure in the respective circuit to increase over the desired value. Thanks to the feedback provided by the temperature sensor, which detects an increase in the temperature of the brewing water, the proper temperature of the brewing water can be restored, by acting on the hot water-cold water ratio, by means of one of the above mentioned electrovalves.

Such a solution allows the brewing temperature to be maintained within desired values but it is not able to solve the problem of the decrease in water flow rate, thus causing the dispensing time to increase.

According to an aspect of the present invention, the device is provided with a pressure sensor able to detect the increase in pressure caused by the above mentioned expansion of the water. Alternatively, or additionally, a flow rate sensor, such as a displacement meter, can detect the decrease in the water flow rate towards the brewing chamber.

Thanks to the additional feedback provided by the pressure sensor and/or the flow rate sensor, the device can adjust the flow rate of the brewing water in function of the temperature variation of the brewing water itself. Typically, such an adjustment is carried out by a variable flow-rate pump.

Thanks to this, a predetermined brewing/dispensing time for each beverage can be maintained according to the desired brewing temperature (or temperatures).

An additional object of the invention is a process for dispensing beverages from a device of the above described type, characterized according to claim 14.

According to a first aspect of the invention, the device controls the brewing temperature in function of the dispensing time of the beverage. In more detail, in a first embodiment, the device feedback controls that the brewing temperature remains constant as a function of the dispensing time.

In a second embodiment, during a beverage preparation, the brewing temperature is changed as a function of the brewing time, according to a predetermined temperature profile. In that case, the device feedback controls, minute by minute, whether the actual brewing temperature, detected by the temperature sensor, is equal to the temperature at the corresponding minute of the predetermined temperature profile. In case of discrepancies, to compensate for the discrepancies themselves, the device acts on the electrovalves for adjusting the hot water—cold water ratio.

Such control system is particularly easy. However, the brewing time of a beverage is affected by several factors, that may be variable over time (coffee grain size, ambient humidity, etc.). If a standard profile is applied to subsequent beverages which, although of the same type, have brewing times different from one another, this can result in inaccuracies in the temperature control.

According to an aspect of the present invention, in order to obtain a highly accurate control, the brewing temperature is adjusted in function of the brewing volume.

In particular, the process of the present invention allows obtaining a determined profile of brewing temperature as a function of the volume of brewing water during a beverage dispensing through the device according to the present invention.

In other words, according to an aspect of the present invention, the brewing temperature is controlled during the beverage dispensing in function of the amount of water supplied to the brewing chamber (and thus of the amount of dispensed beverage).

For example, for dispensing a 50 cc beverage, all of the 50 cc of dispensed beverage can be controlled to have a preset brewing temperature. In other words, the device controls the dispensed volume of the beverage at a given rate, for example every 1 cc. A 50 cc dispensing is therefore "divided" into several volume amounts. In the mentioned example, the beverage is "divided" into fifty subsequent volume amounts (equal to 1 cc). Therefore, in the present embodiment, the device feedback controls each amount of dispensed volume to have the preset brewing temperature. If a temperature different from the preset one is detected, in order to adjust the water temperature to the desired value, the valves on the hot and cold water ducts have to be operated.

Further, a beverage can be provided at a not-constant temperature during dispensing. In such an embodiment, during the beverage dispensing, the brewing temperature is changed in function of the amount of water supplied to the brewing chamber.

For example, for dispensing a 50 cc beverage, at the beginning 20 cc of brewing water at a first temperature can be supplied to the brewing chamber, followed by 30 cc of brewing water at a second temperature different from the first temperature.

In general, the control of the brewing temperature in function of the dispensed volume of beverage has proven to be particularly effective, because such a control is independent of the brewing time, which can be affected by several parameters, including the grain size of the ingredients placed in the brewing chamber for preparing the beverage itself. In other words, a control during the entire beverage dispensing time can be guarantee by adjusting the temperature in function of the volume of water dispensed in the brewing chamber.

An additional object of the invention is a data medium according to claim 20.

The invention presents a number of advantages relative to the previous art. In fact, by directly or indirectly detecting the temperature of brewing liquid and changing the flow rate of hot and cold water to the brewing chamber based on detected temperature data, it is possible to compensate variations of other parameters, such as for example the pressure of the brewing liquid. In this way, it is possible to compensate or reduce potential variations of time of beverage brewing/dispensing.

The invention further allows carrying out the brewing, i.e. the beverage extraction, in particular of coffee, with different temperatures according to the coffee type to be dispensed. Thereby, an "American" coffee of e.g. 200-250 ml, can be obtained through a first brewing part carried out for example at 90-92° C. for a first limited time in order to extract the best part of the blend aromas, whereas the remaining extraction part will be carried out at a lower temperature, e.g. at 80-85° C., in order to extract from the blend of powdered coffee the most bitter compounds that are less interesting about aroma.

BRIEF DESCRIPTION OF THE DRAWINGS

These and other advantages will be hereinafter further described referring to the following description, reported for illustrative and not limitative purposes, referring to the attached schematic drawings, in which:

FIG. 1 is a functional scheme of the device according to the present invention.

MODES FOR IMPLEMENTING THE INVENTION

The device 1 for the controlled beverage dispensing comprises one or more brewing groups 2. FIG. 1 shows, for a better descriptive simplicity, the device 1 provided with only one brewing group 2 comprising a brewing chamber 10 with an inlet 2a for the brewing water.

The device 1 comprises heating means 40 for heating the brewing water; in the particular shown embodiment, these means 40 comprise a boiler 3 provided with at least one heat exchanger 4 with an inlet 4a and an outlet 4b for the flow of water to be heated. The outlet 4b of the heat exchanger 4 is hydraulically connected to the brewing chamber 10 through a first duct 9.

In particular, the boiler 3 contains, in its inside, water at a temperature higher than 100° C. heated by a heating element 3a that could be, for example, an electric resistance. The heat exchanger 4 is placed inside the boiler 3 and is contacting the hot water inside it; the water is present both in liquid and vapor state. FIG. 1 shows figuratively the separation surface of the two phases with a dotted line, the vapor storing up in the upper part of the boiler 3.

The device 1 further comprises at least one pump 5 with an inlet 5a and an outlet 5b, to feed hot water from the heating means 40 to the brewing chamber 2.

The pump 5, which could have a fixed or variable flow rate, supplies the cold water coming from the mains connection or an independent tank (not shown) to the inlet 4a of the heat exchanger 4 at a determined flow rate as a function of the beverage to be dispensed. In a possible embodiment, not shown, the device 1 comprises a single pump 5 for each brewing group 2. The device comprises means 20 for supplying cold water to the first duct 9 that, in the particular shown embodiment, comprise the pump 5 and a duct 21 connecting hydraulically the outlet 5b of the pump 5 with the first duct 9 in a supply point 9a. FIG. 1 shows a particular embodiment in which, in the supply point 9a, there is a fitting 12 hydraulically connecting the duct 9 with the duct 21 and the outlet 4b of the heat exchanger 4.

The outlet 5b of the pump 5 is hydraulically connected with the inlet 4a of the heat exchanger 4 and with the duct 21 of the means 20 through an additional fitting 13. Additional embodiments are anyway provided in which the device 1 can comprise, for example, two pumps 5 for supplying cold water to the heat exchanger 4 and the duct 21 separately, then without the aid of a fitting 13, while remaining in the protection scope of the present invention.

The water supplied into the heat exchanger 4 by means of the pump 5 absorbs the heat given by the water contained inside the boiler 3 and, once the outlet 4b of the heat exchanger 4 has been reached, it reaches the maximum working temperature (about 93° C.).

The device 1 comprises a first proportional electrovalve 7 arranged on the duct 21 and preferably also a second electrovalve 6 arranged on the first duct 9 that connects hydraulically the outlet 4b of the heat exchanger with the inlet 2a of the brewing chamber 10. In the preferred embodiment shown in FIG. 1, the electrovalve 6 is arranged upstream the supply point 9a with respect to the water flow; an additional embodiment can provide a second electrovalve 6 placed downstream the supply point 9a with respect to the water flow, while remaining in the scope of the present invention.

The brewing group preferably comprises, in a way known per se in the art, an additional electrovalve 11 controlling the dispensing of brewing water to the brewing chamber 10 of the group 2.

By adjusting the opening and/or closing of at least the electrovalve 7 it is possible to mix, inside the duct 9 downstream the supply point 9a, the hot water coming from the outlet of the heat exchanger 4 with the cold water coming from the duct 21, in the required ratios for obtaining the brewing water at the desired temperature.

The electrovalve 7 is of the proportional type, it is thereby possible to adjust the flow rate of cold water fed into the duct 9 in the supply point 9a.

Preferably, both the electrovalves 6 and 7 are of the proportional type, in order to simultaneously and independently control the flow rates of hot and cold water to be supplied into the brewing chamber 10 while remaining in the protection scope of the present invention.

Preferably, the device 1 also comprises at least one displacement meter 26 that is preferably arranged between the outlet 5b of the pump 5 and the first fitting 13 in order to detect the volume of supplied water from the pump 5 to the brewing group 2. Additional embodiments can provide a displacement meter arranged on the duct 9 downstream the supply point 9a with respect to the water flow and/or at least one displacement meter arranged on the duct 9 upstream the supply point 9a with respect to the water flow and/or at least one displacement meter arranged on the duct 21, while remaining in the protection scope of the present invention.

The brewing chamber 10 comprises a first upper filter 16, commonly called "small shower", hydraulically connected to the inlet 2a of the brewing chamber. The filter 16 has the function of uniformly distributing the mixed hot water into the duct 9, assuring a uniform moistening and wetting of the powdered coffee contained in the brewing chamber 10 and avoiding the powdered coffee from the introduction into the duct 9. The brewing chamber 10 comprises a second lower filter 17 on which the powdered coffee is settled and by which the ready-made beverage dispensed from the outlet 2b of the brewing chamber 10 is filtered.

The device 1 further comprises at least one temperature sensor 15 placed on the circuit, downstream the supply point 9a with respect to the water flow. Referring to the preferred embodiment of FIG. 1, the temperature sensor 15, which can be for example a thermocouple, is placed inside the brewing chamber 10 and, in particular, it is placed at the filter 16, for example immediately upstream thereto, with respect to the water flow. In a preferred embodiment of the invention, the sensor 15 projects a little bit from the filter 16 so that to be able to contact the powdered coffee when the brewing chamber is closed. The temperature of the brewing water can be determined by the temperature sensor 15 at the coffee cake.

In other embodiments, the sensor 15 can be placed in the supply point or downstream it, where the mixing of cold and hot water occurs, in addition other temperature sensors can be present, both in the brewing chamber and between the chamber and the supply point 9*a*.

In the particular shown embodiment, the device 1 comprises a brewing group 2 generally used in conventional machines, where the brewing chamber 10 is contained at least partially inside a so-called "filter-holder" that can be manually inserted or drawn out from the brewing group 2 by the user, in order to settle in its inside the powdered coffee and to eject the coffee cake after the beverage has been infused and dispensed.

An additional embodiment can provide a brewing group used in automatic machines in which the user can not draw out the brewing chamber from the brewing group. In this latter case, at least one temperature sensor 15 can be placed at the outlet 2*b* too of the brewing chamber 10, at the second filter 17, in order to determine the temperature of the dispensed beverage.

The brewing group 2, in the particular shown embodiment, further comprises a heating element 8 placed inside the metallic mass to heat the brewing group up to a temperature adapted to avoid the brewing water cooling, for example if the device has been inactive for a long time. Other embodiments can provide a brewing group in which its own metallic mass is contacting the boiler and/or in which it own metallic mass is heated by the hot water contained in the boiler 3 by means of a termosiphon-like circuit. Advantageously, a temperature sensor 18 placed on the brewing group is provided for detecting the temperature thereof.

The device 1 can further comprise at least one pressure sensor 50 that can be, for example, a piezoelectric transducer placed at least next to the inlet 2*a* of the brewing chamber 10 for the measurement of the brewing water pressure at least next the coffee cake.

The device 1 comprises a logic unit 19 adapted to control the pump 5, the electrovalves 6 (if present) and 7 and to acquire the temperature values determined through the afore mentioned temperature sensors 15 and 18.

The logic unit 19 is further adapted to acquire the value of water amount supplied from the pump 5 to the inlet 2*a* of the brewing chamber determined by means of at least the displacement meter 26; additional displacement meters (not shown) can be arranged upstream the inlet of the brewing chamber, for example for measuring the flow of cold and hot water separately.

The logic unit 19 comprises an inner or outer memory 22 in which a map is stored where a determined volume of brewing water is associated with every type of beverage, and optionally also a determined temperature profile as a function of the volume and/or dispensing time.

In particular, for every type of beverage to be dispensed a particular temperature profile is associated, in which for each volume of brewing water is associated a determined temperature value the brewing water must reach.

In other words, according to an aspect of the invention, the logic unit 19 associates a temperature profile with the different types of beverages. The temperature of each temperature profile is a function of the progress in dispensing the beverage and, in particular, of the water volume fed into the brewing chamber, independently of the time.

In more detail, a specific temperature of the brewing water is associated with each volume value of brewing water fed in succession to the brewing chamber.

The volume values are stored with a predetermined step (lower than 1 cc) and for each volume value the logic unit 19 compares, in real time, the temperature value determined by at least one temperature sensor 15 with the temperature value in the memory. By comparing these temperature values, the logic unit 19 adjusts in time the electrovalve 7 and/or 6 so as to compensate for any detected discrepancy with respect to the temperature profile stored in the map in the memory.

For example, for a 200 ml beverage, at first 50 ml of brewing water can be supplied to the brewing chamber at a first temperature. At a later stage, 100 ml at a second temperature different from the first temperature, and the last 50 ml at a third temperature different from the second temperature, can be supplied. Through the feedback provided by the temperature sensor 15, the logic unit 19 verifies if the brewing temperature follows the temperature profile during the water supply to the brewing chamber 10, and corrects any errors by operating the electrovalve 7 and/or 6.

The control of the electrovalve 7 can be of a closed- or open-loop type, in this latter case, the device 1 can comprise an additional displacement meter arranged on the duct 21; then the logic unit 19 adjusts the flow rate of cold water by means of the electrovalve 7 so that the volume value determined by the displacement meter on the duct 21 is equal to the flow rate value of cold water calculated by the logic unit 19 according to the comparison among the temperature values determined through at least one sensor 15 and the temperature values in the memory.

The logic unit 19 controls the switching of the electrovalve 6 for putting hot water into the brewing chamber 10. In order to obtain temperature profiles with high temperature variations, the logic unit 19 can, for example, control the closing of the electrovalve 6 for putting a volume of cold water greater than the volume of hot water.

In case in which also the electrovalve 6 is of proportional type, the logic unit further adjusts the flow rate of hot water supplied into the brewing chamber. In this case it is then possible to obtain temperature profiles with high temperature variations more precisely than in the embodiment in which only the electrovalve 7 is of proportional type.

The logic unit 19 is further adapted to acquire the pressure values determined by means of a sensor pressure placed at the inlet 2*a* of the brewing chamber 10.

As previously mentioned, the grain size of the ingredient for preparing the beverage can cause the water flow towards the brewing chamber to undesirably decrease and, as a consequence, the water itself to expand (thereby increasing in pressure).

Such a pressure increase can be detected by means of the pressure sensor 50, thereby detecting the undesired overheating of the hot water. Alternatively, or additionally, the flow rate sensor (e.g. a displacement meter) 26 can detect the flow rate decrease. By increasing the flow rate of the pump 5, the proper time for the water to pass within the heat exchanger 4 can be restored. In particular, thanks to such an adjustment, the temperature of the hot water can be corrected and, simultaneously, a proper brewing time can be guaranteed.

Meanwhile, through the feedback provided by the temperature sensor 15, the logic unit 19 also operates the electrovalve 7 (and preferably also the electrovalve 6), so that to maintain the temperature of the brewing water within the desired range.

The invention claimed is:

1. Device for dispensing beverages comprising:
   at least one brewing group,
   heating means for heating brewing water,
   a first duct connecting said heating means to said brewing group,
   at least one pump for feeding hot water from said heating means to the brewing group,
   means for supplying cold water to said first duct in a supply point,
   a first valve arranged on said means for supplying cold water to the first duct,
   at least one first temperature sensor arranged on said first duct downstream from said supply point of cold water, with respect to the water flow, and
   a second valve arranged on said first duct,
   wherein at least one of said first and second valves is a proportional valve,
   wherein said brewing group comprises: a brewing chamber with an inlet for the brewing water and an outlet for the beverage, a metallic mass defining a portion of said brewing chamber, a further heating element located in or in the vicinity of the brewing chamber to heat said metallic mass independently from the temperature of said brewing water, and a second temperature sensor located at the brewing chamber to detect the temperature of said metallic mass,
   wherein the device includes a logic unit configured to control said pump, said heating element and said first and second valves, said logic unit being configured to acquire temperature values determined by said temperature sensors.

2. Device according to claim 1, wherein said heating means comprise a boiler and at least one heat exchanger.

3. Device according to claim 1, wherein said at least one pump is connected to the inlet of said heating means and is further connected to a second duct forming said supplying means of cold water to the first duct.

4. Device according to claim 1, wherein said first and second valves are proportional electrovalves for controlling the flow rate of hot and cold water into said first and second ducts.

5. Device according to claim 1, wherein said second electrovalve is arranged between said supply point of cold water and said heating means.

6. Device according to claim 1, comprising at least one displacement meter arranged upstream the inlet of the brewing chamber with respect to the water flow.

7. Device according to claim 1, wherein said at least one temperature sensor is placed in said brewing chamber.

8. Device according to claim 7, wherein said temperature sensor is placed at one of the filters of the brewing chamber in order to contact the coffee when the brewing chamber is closed.

9. Device according to claim 1, wherein said at least one-temperature sensor is placed at the inlet or the outlet of said brewing chamber.

10. Device according to claim 1, comprising a temperature sensor placed in said mixing point of hot and cold water.

11. Device according to claim 1, further comprising at least one pressure sensor, placed at the inlet of said brewing chamber.

12. Process for dispensing hot beverages from a device according to claim 1, said device comprising:
   a brewing chamber,
   means for supplying brewing water to said brewing chamber,
   at least one temperature sensor,
   means for mixing hot water and cold water in order to produce said brewing water, and
   a control logic unit,
   wherein the process comprises the steps of:
   providing information about the beverage to be dispensed to a control logic unit, said information comprising the brewing temperature,
   providing heated water and cold water,
   mixing said cold water with said hot water and supplying said mixture to the brewing chamber,
   detecting a temperature of the brewing water in said brewing chamber, and
   adjusting the amount of cold water mixed with the hot water up to reach a desired brewing temperature inside the brewing chamber, said adjustment being carried out by means of a proportional valve.

13. Process according to claim 12, wherein the flow rates of cold and hot water are adjusted by means of at least two proportional electrovalves.

14. Process according to claim 13, further comprising the steps of detecting at least one parameter selected from pressure, volume, flow rate of the brewing liquid and brewing time.

15. Process according to claim 14, further comprising the step of changing the flow rate of the brewing water towards the brewing chamber in response to a temperature variation of the brewing water in order to modify the temperature of water exiting from said heating means.

16. Process according to claim 12, wherein the temperature of the brewing liquid is controlled and possibly changed in function of the amount of water supplied to the brewing chamber during the brewing step of the beverage.

17. Process according to claim 16, wherein a first brewing time period is carried out at a first temperature and wherein said first temperature is changed in a subsequent brewing time period.

18. A non-transitory data medium, adapted to be read by a computer and/or a logic unit, said medium comprising instructions that, once read by a logic unit of a device according to claim 1, causes said device to carry out the steps of: providing information about the beverage to be dispensed to said control logic unit, said information comprising a desired brewing temperature, providing heated water and cold water, mixing said cold water with said hot water and supplying said mixture to the brewing chamber, detecting a temperature of the brewing water in said brewing chamber and adjusting the amount of cold water mixed with the hot water up to reach the desired brewing temperature inside the brewing chamber, said adjustment being carried out by means of a proportional valve.

19. Device according to claim 11, wherein the at least one pressure sensor is a piezoelectric transducer.

20. Process according to claim 12, which further comprises heating the metallic mass of the brewing group independently from the temperature of the brewing water.

* * * * *